Figure 1:
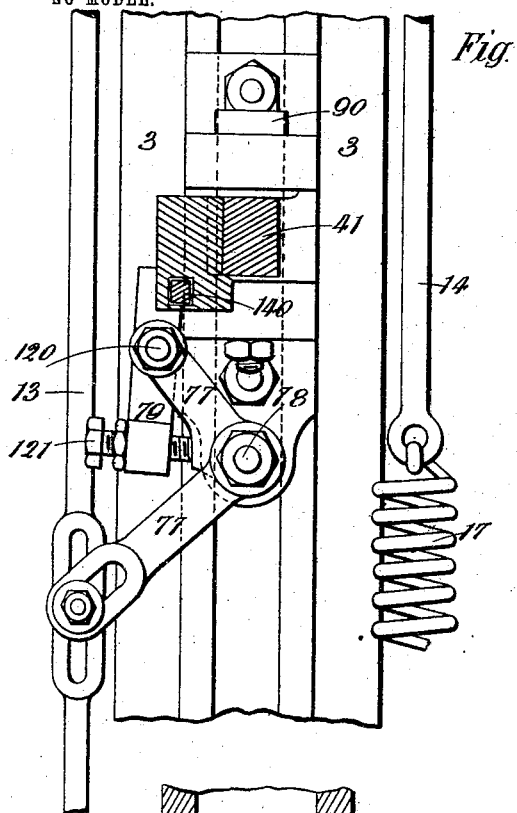

No. 767,578. PATENTED AUG. 16, 1904.
C. LEISTNER.
MACHINE FOR MANUFACTURING GLASS BOTTLES.
APPLICATION FILED JULY 7, 1902.
NO MODEL. 3 SHEETS—SHEET 1.

WITNESSES:
Ellis Owen
John Smith

INVENTOR:
Carl Leistner

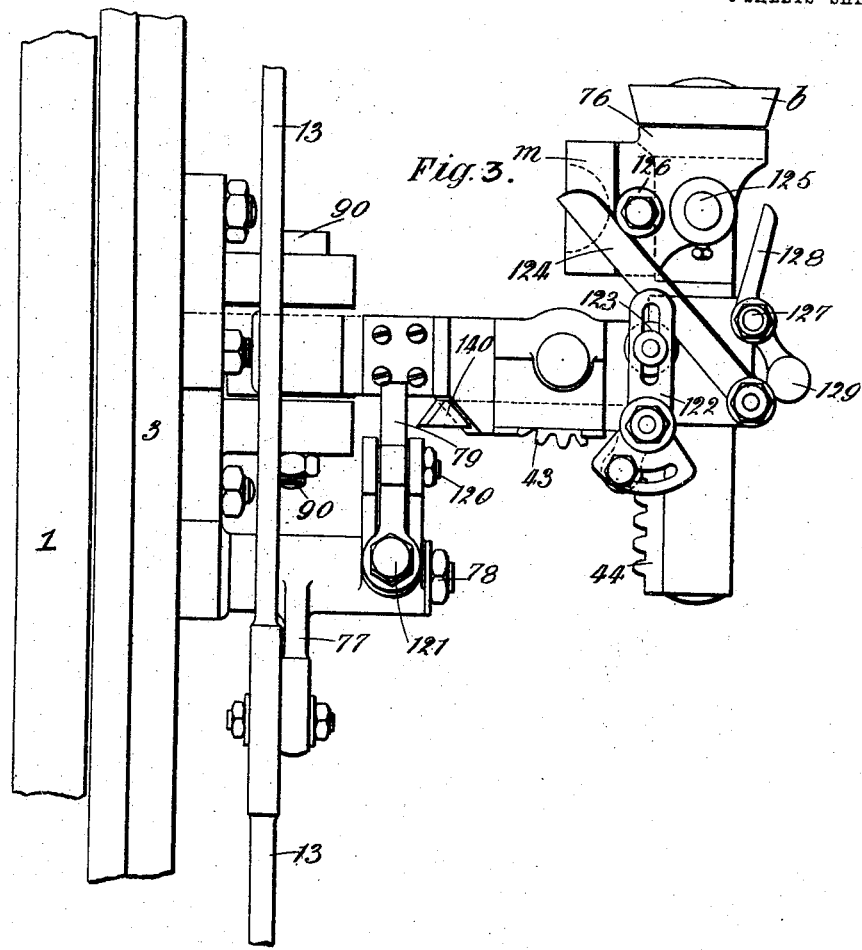
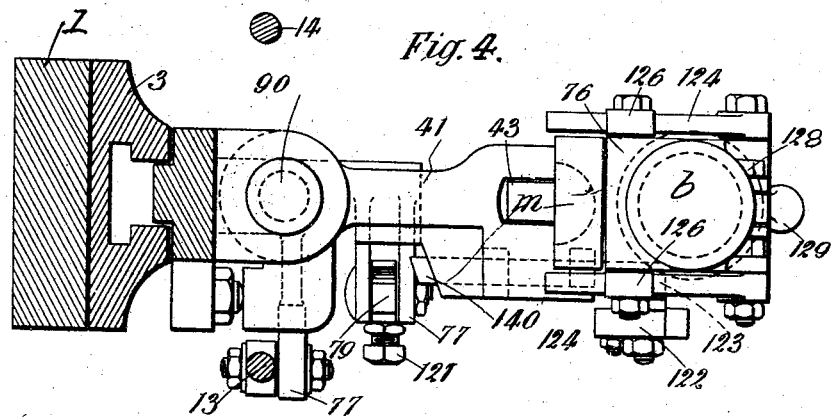

No. 767,578. PATENTED AUG. 16, 1904.
C. LEISTNER.
MACHINE FOR MANUFACTURING GLASS BOTTLES.
APPLICATION FILED JULY 7, 1902.
NO MODEL. 3 SHEETS—SHEET 3.

WITNESSES.
Ellis Owen
John Smith.

INVENTOR
Carl Leistner
by W. E. Evans.
ATTORNEY.

No. 767,578. Patented August 16, 1904.

UNITED STATES PATENT OFFICE.

CARL LEISTNER, OF LONDON, ENGLAND.

MACHINE FOR MANUFACTURING GLASS BOTTLES.

SPECIFICATION forming part of Letters Patent No. 767,578, dated August 16, 1904.

Application filed July 7, 1902. Serial No. 114,615. (No model.)

*To all whom it may concern:*

Be it known that I, CARL LEISTNER, a subject of the German Emperor, residing at 100 The Avenue, Bruce Grove, Tottenham, London, England, have invented certain new and useful Improvements Relating to Machines for Manufacturing Glass Bottles, of which the following is a specification.

This invention relates to machines for the manufacture of glass bottles and other hollow vessels, and more especially relates to the machines described in Patent No. 704,055, dated July 8, 1902.

The invention has for its object to provide convenient and effective means for discharging the finished bottle and to shape or work the parison prior to blowing in the finishing-mold.

According to the invention the bottom mold is provided so as to be capable of being tilted to bring in its place a block for the shaping, working, or marvering of the parison prior to its being blown in the finishing-mold.

In the accompanying drawings a complete glass-bottle-blowing machine is not shown. The mold-carrying arm and connected parts are alone illustrated, which arm would substitute the carrying-arm 87, carrying the bottom mold $m^3$ and the connected parts of the machine illustrated in the drawings accompanying the specification of the prior patent of the United States before referred to.

Figure 2:
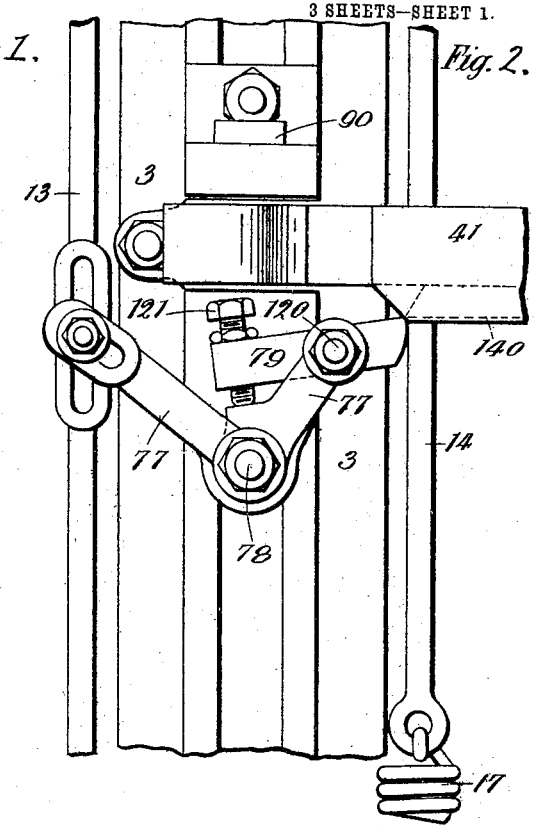
Figure 7:
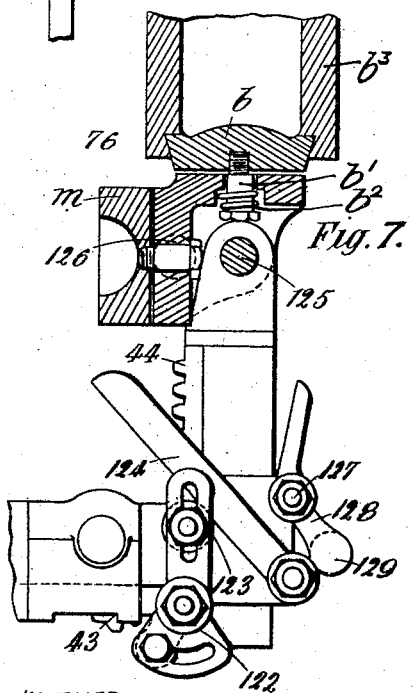
Figure 8:
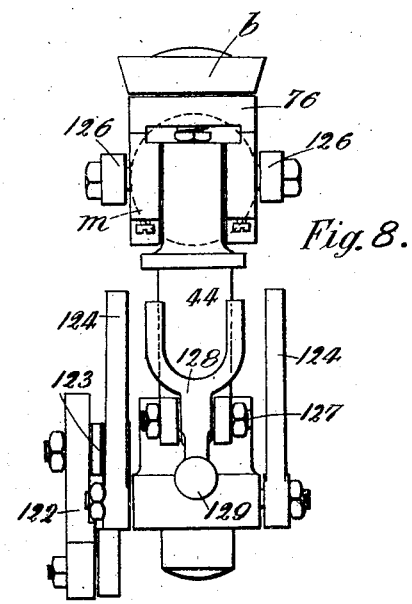
Figure 5:
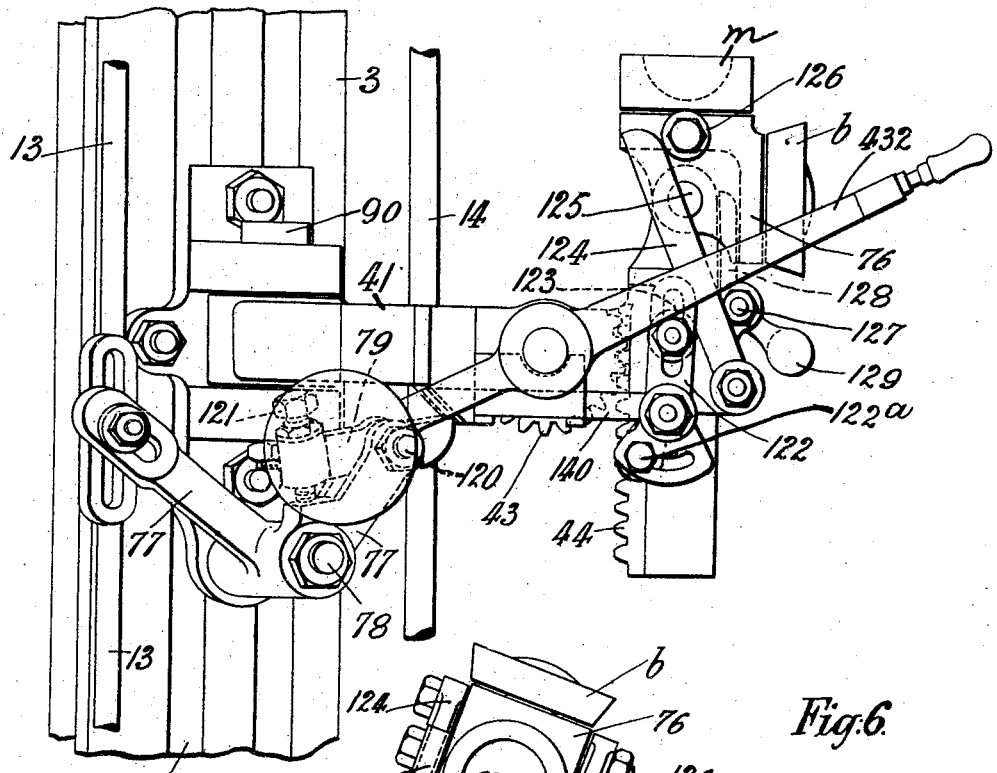
Figure 6:
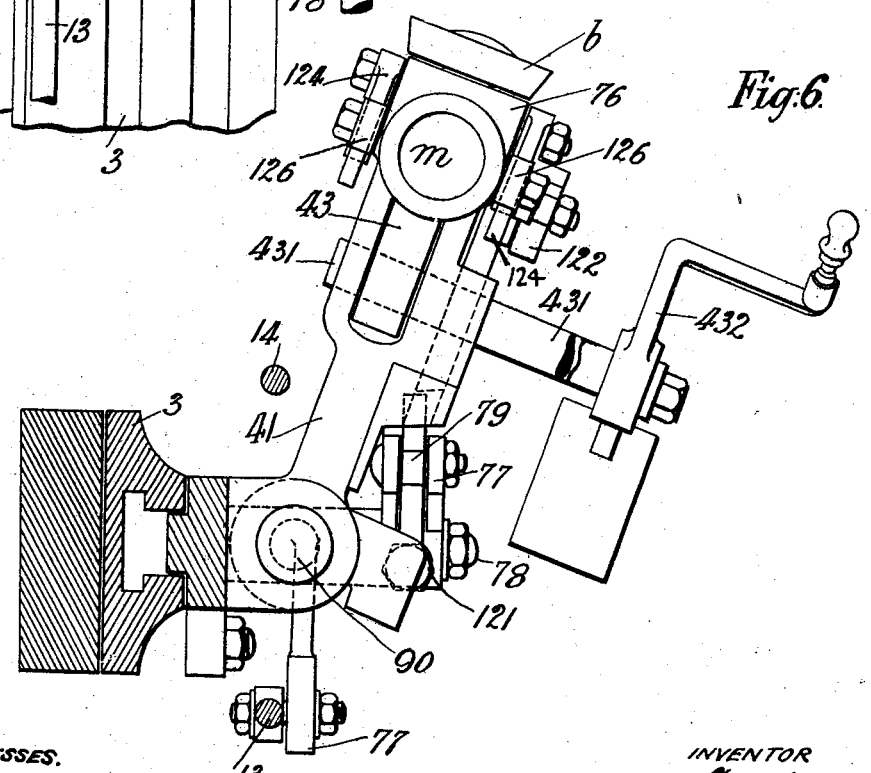

In the drawings, Figure 1 represents a front view, partly in section, of the bottom-mold-carrying arm and its connected parts when the said arm is in the position at right angles to the supporting pillar or frame of the machine. Fig. 2 is a front elevation corresponding to Fig. 1, in which the carrying-arm is shown near its extreme position that it assumes on the delivery of a finished bottle. Fig. 3 is a side elevation corresponding to Fig. 1. Fig. 4 is a plan view of Fig. 3. Fig. 5 is a view the same as Fig. 2, but showing also the bottom mold and its connected parts. Fig. 6 is a plan view corresponding to Fig. 5. Fig. 7 is a side elevation, partly in section, showing the bottom mold in position closed in by the finishing-mold; and Fig. 8 is a front elevation corresponding thereto.

In carrying the invention into effect the carrying-arm 41 of the bottom mold $b$ is pivoted upon the pivoting-pin 90 within a bracket which is secured to the slotted plate 3 by means of T-headed bolts or by other suitable means, the slotted plate 3 being carried upon the supporting pillar or frame 1, and the arm 41 may thus be adjusted in height, as required.

In the drawings the tension-rods 13 and 14 are shown, the former of which is connected to an operating pedal-lever, while the latter is connected to a spring 17, and the upper extremities of both are connected to the chain by which the gear controlling the opening and closure of the parison and finishing molds is operated in such manner that on the depression of the pedal-lever the parison and finishing molds are closed, while on the release thereof they are opened by the action of the spiral spring 17 in the manner fully described in the specification of the prior patent before referred to.

On the upward movement of the tension-rod 13 under the action of the spring 17 the angle-lever 77 is rotated on its pivoting-pin 78, the arm of the angle-lever 77 being for the purpose connected to the rod 13 by such means as a slot-and-pin connection. In this movement the finger-piece 79, which is carried upon a pin 120 by the other arm of the angle-lever 77, makes contact with the carrying-arm 41 and causes it to move to the side. The extremity of the finger-piece 79 is so adjusted, by means of the adjusting-screw 121, that contact shall only be made after an interval sufficient for the finishing-mold to have released the bottom mold $b$. In this lateral movement of the carrying-arm 41 the end of the finger-piece 79 will slide down the side of the arm in order to be released at its extreme lateral position, whereupon the carrying-arm 41 is returned into its original position concentric with the parison and finishing molds when closed, by such means, for example, as flat springs arranged on each side of the carrying-arm or other suitable device for bringing back the carrying-arm into the center line of the machine. In the return movement of the carrying-arm 41 to its original position the finger-piece 79 may be slightly turned down. Shortly before the finger-piece 79 slides off the arm 41 it presses against a bolt 140, provided within a guide on the arm 41, and forces it forward. At the opposite end of this bolt an arm 122, pivoted at 122ª, is connected, which arm carries a roller 123, upon which lies a single-armed lever 124, pivoted at its lower extremity on the front end of the arm 41. The arm 122 is pivoted upon the carrying-arm 41 in such manner that the radial position of the arm may be changed for the adjustment of its position in relation to the lever 124 and the bolt 140, a curved slot in the arm 122 being provided for the purpose.

The arm 41 carries at its extremity the tooth-rod 44, whose vertical position is controlled by means of a toothed segment or pinion 43 upon the spindle 431, of which a counterbalanced operating-lever 432 is provided, Fig. 6. The operating-lever 432 is so weighted that the whole or nearly the whole weight of the mold is balanced, so that when the bottom mold is released the weight of the finished bottle will carry the mold slowly down from the position indicated in Figs. 7 and 8 to that indicated in Figs. 3 and 5.

The bottom mold $b$ is mounted upon a supporting part 76, pivoted at 125 to the toothed rod 44, and is connected thereto by means of a stud $b'$, between the head of which and the under face of the supporting part 76 a spiral spring $b^2$ is arranged, against the action of which the bottom mold $b$ may be drawn up accurately into its position on the closure of the finishing-mold upon it. The bottom mold $b$ is provided with a conical edge entering into an annular groove of corresponding form in the finishing-mold $b^3$, so that thus the bottom mold $b$ will always be brought up into its exact position by the finishing-mold, notwithstanding any inexactness of adjustment or position of the carrying-arm or consequences of expansion and contraction of the parts subject to substantial changes of temperature.

The supporting part 76 carries at its side the roller 126, beneath which the lever 124 lies.

In operation it will be understood that as soon as the finger-piece 79 presses against the end of the sliding bolt 140 the latter is forced outward, and thereby the lever 124 will make a corresponding movement around its pivot, whereby it presses beneath the roller 126 and effects the partial rotation of the supporting part 76 of the mold $b$ upon the axis 125, so that the finished bottle carried by the bottom mold falls down and is conveniently received in an asbestos cradle arranged in a suitable position to receive it. The finger-piece 79 continues its movement further and slides off the face of the arm 41, so that the latter may be returned to its original position by its spring. The bolt 140 acts under the influence of a spring, (not shown in the drawings,) whereby it immediately resumes its original position after the finger-piece 79 has passed off the face of the carrying-arm.

A block $m$ is provided on the supporting part 76 in a position at right angles to the bottom mold $b$ and may be mounted thereon, as illustrated in Fig. 7, so that when the mold $b$ is tilted for discharging the bottle, as hereinbefore described, the block $m$ lies uppermost, and the weight of the mold $b$ is such as to maintain it in that tilted position, as illustrated in Fig. 5.

The carrying-arm 41, it will be understood, returns to its original position after the bottom mold is tilted, as hereinbefore described, and thus carries the block $m$. If the operative has now swung down the next parison formed in the parison-mold, he will now be able to shape, work, or marver it in the block $m$ before he incloses it for blowing in the finishing-mold. He thus requires only to lift the toothed rod 44 by means of the lever 432 so far that the block receives the lower end of the parison and shapes, works, or marvers it in the known manner. If the desired shape and distribution of the glass is effected, the block $m$ is again lowered and the bottom mold $b$ is brought uppermost, as hereinafter described, and the latter is again lifted. Thereupon the finishing-mold is closed, and the complete blowing of the bottle is effected in such manner as that described in the specification of the prior patent of the United States hereinbefore referred to.

As the exchange for the bottom mold $b$ for the block $m$ after the delivery of the finished bottle is effected automatically, it is of course desirable that after the shaping, working, or marvering is effected the block $m$ should be automatically exchanged for the mold $b$. For the purpose an angle-lever 128 is provided at the extremity of the carrying-arm 41 on a pivot-pin 127 and is provided with a weighted arm 129, which serves to cause the other forked arm of the lever to assume the position indicated in Fig. 3 when left to itself.

On the discharge of a finished bottle, as hereinbefore described, the bottom mold $b$ strikes against the forked arm of the lever 128 and presses it against the side of the toothed rod 44. If now for the purpose of shaping, working, or marvering the parison the toothed rod 44 is again lifted, the bottom mold $b$, moving upwardly, will free the forked arm of the lever 128, so that the latter will, under the action of the weighted arm 129, take up its inclined position, as illustrated in Figs. 3 and 7. If now after the shaping, working, or marvering of the parison the toothed rod 44 is again lowered by the lever 432, the downwardly-directed bottom mold $b$ will contact with the forked arm of the lever 128, so that thereby the supporting part 76 is turned upon its axis 125 and the mold $b$ again becomes uppermost, as illustrated in Fig. 3. The mold $b$ is now lifted so far that it takes up the bottom of the parison, whereupon the complete blowing takes place in the finishing-mold, which is previously closed upon the bottom mold $b$. After the blowing is completed and the molds are opened the bottom mold $b$ is again lowered by the weight of the finished bottle, while the carrying-arm is again swung laterally and the finished bottle delivered, and thus the block $m$ is again brought into the previous position of the bottom mold.

What I claim as my invention, and desire to secure by Letters Patent, is—

1. In glass-bottle-blowing machines, a bottom mold pivoted upon a horizontal axis, a block pivoted upon a horizontal axis, and means for bringing said bottom mold and block alternately uppermost.

2. In glass-bottle-blowing machines, a bottom mold, a block at right angles to said mold and immovable with reference thereto, and means for bringing said mold and block alternately uppermost, substantially as described.

3. In glass-bottle-blowing machines, a bottom mold, a pivoted supporting part for said bottom mold, a block also carried by said supporting part, and means for bringing said bottom mold and block alternately uppermost, substantially as described.

4. In glass-bottle-blowing machines, a bottom mold, a block at right angles to said mold, means for moving said mold laterally to deliver a finished bottle, and means for bringing the block uppermost after delivery thereof, substantially as described.

5. In glass-bottle-blowing machines, a bottom mold, a block at right angles to said mold, means for moving said mold laterally to deliver a finished bottle, means for bringing the block uppermost after the delivery thereof, means for lifting the block, and means for bringing the mold again uppermost, substantially as described.

6. In glass-bottle-blowing machines, a bottom mold, a block at right angles to said mold, means for automatically bringing the block uppermost, and means for automatically bringing the mold again uppermost, substantially as described.

7. In glass-bottle-blowing machines, a bottom mold, a block at right angles to said mold, a carrying-arm for said mold and block, means for laterally moving said carrying-arm, means for discharging a finished bottle and for bringing said block uppermost on the lateral movement of said carrying-arm, said means consisting of a sliding bolt and levers, substantially as described.

8. In glass-bottle-blowing machines, a bottom mold, a block at right angles to said mold, a supporting part for said mold and block, a carrying-arm for said supporting part, means for laterally moving said carrying-arm, means for discharging a finished bottle, and for bringing said block uppermost on the lateral movement of said carrying-arm, said means consisting of a sliding bolt, a lever connected thereto, an arm actuated by said lever, said arm actuating the supporting part, substantially as described.

9. In glass-bottle-blowing machines, a bottom mold, a block at right angles thereto, means for bringing said block uppermost, and a lever closed upon by the bottom mold when said block is brought uppermost, means for raising said mold and block, and for lowering them to be tilted by said lever to restore the mold uppermost, substantially as described.

10. In glass-bottle-blowing machines, a bottom mold, a block at right angles thereto, a supporting part for said mold and block, means for bringing said block uppermost, and a lever closed upon by the bottom mold when said block is brought uppermost, means for raising said supporting part, and for lowering it to be tilted by said lever to restore the mold uppermost, substantially as described.

11. In glass-bottle-blowing machines, a bottom mold, a block, a supporting part for said mold and block, a carrying-arm for said supporting part, a tension-rod, an angle-lever secured thereto, an adjustable finger-piece carried by said angle-lever, a bottom-mold-carrying arm laterally moved by said finger-piece, a bottom mold carried by said carrying-arm, a block at right angles thereto, and means actuated by said finger-piece for bringing said block uppermost on the lateral movement of said carrying-arm, substantially as described.

12. In glass-bottle-blowing machines, a bottom mold, a block at right angles to said mold, a supporting part for said mold and block, a carrying-arm for said supporting part, means for laterally moving said carrying-arm, means for discharging a finished bottle, and for bringing said block uppermost on the lateral movement of said carrying-arm, said means consisting of a sliding bolt, a lever connected thereto, an arm actuated by said lever, said arm actuating the supporting part, and means for automatically restoring said bottom mold uppermost, substantially as described.

13. In glass-bottle-blowing machines, a bottom mold, a block, a supporting part for said mold and block, a carrying-arm for said supporting part, a tension-rod, an angle-lever secured thereto, an adjustable finger-piece carried by said angle-lever, a bottom-mold-carrying arm laterally moved by said finger-piece, a bottom mold carried by said carrying-arm, a block at right angles thereto, and means actuated by said finger-piece for bringing said block uppermost on the lateral movement of said carrying-arm, and means for automatically restoring said bottom mold uppermost, substantially as described.

14. In glass-bottle-blowing machines, a bottom mold having a conical rim, a supporting part upon which said mold is mounted, a spring between said bottom mold and said supporting part, and a block also mounted upon said supporting part, and a finishing-mold to close upon said bottom mold, said finishing-mold having an annular groove to take the conical rim of the bottom mold, substantially as described.

In witness whereof I have signed my name to this specification in the presence of two subscribing witnesses.

CARL LEISTNER.

Witnesses:
WILLIAM EDWARD EVANS,
FRIDOLIN FREI.